US008805645B2

(12) United States Patent
Giesekus

(10) Patent No.: US 8,805,645 B2
(45) Date of Patent: Aug. 12, 2014

(54) SYSTEM AND METHOD FOR DETERMINING A POSITION OF A MOVABLE OBJECT, ARRANGEMENT OF GENERAL LIGHTING LED AND LIGHT SENSOR FOR A POSITION DETERMINATION OF A MOVABLE OBJECT

(75) Inventor: Joachim Giesekus, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 390 days.

(21) Appl. No.: 13/186,305

(22) Filed: Jul. 19, 2011

(65) Prior Publication Data
US 2012/0022826 A1  Jan. 26, 2012

(30) Foreign Application Priority Data
Jul. 21, 2010  (DE) .......................... 10 2010 031 629

(51) Int. Cl.
*G01S 1/70* (2006.01)
*G01S 5/16* (2006.01)

(52) U.S. Cl.
USPC ............................ 702/152; 356/614; 356/305

(58) Field of Classification Search
USPC ............. 702/94, 95, 150–152; 356/3.05, 3.1, 356/3.12, 4.01, 614, 615, 623
See application file for complete search history.

(56) References Cited

U.S. PATENT DOCUMENTS

| | | | | |
|---|---|---|---|---|
| 4,148,096 | A | * | 4/1979 | Haas et al. ............... 362/249.14 |
| 5,548,516 | A | * | 8/1996 | Gudat et al. .................... 701/23 |
| 2002/0089722 | A1 | | 7/2002 | Perkins et al. |
| 2003/0125868 | A1 | | 7/2003 | Giannopoulos et al. |
| 2006/0071790 | A1 | | 4/2006 | Duron et al. |
| 2009/0171571 | A1 | * | 7/2009 | Son et al. ...................... 701/208 |

(Continued)

FOREIGN PATENT DOCUMENTS

| | | |
|---|---|---|
| DE | 102007043255 A1 | 11/2007 |
| EP | 1437636 A1 | 7/2004 |

(Continued)

OTHER PUBLICATIONS

Liu, Xiohan et al., "Basic Study on Indoor Location Estimation using Visible Light Communication Platform", 30th Annual Int'l IEEE EMBS Conference, Vancouver, British Columbia, Canada, Aug. 20-24, 2008, pp. 2377-2380.

(Continued)

*Primary Examiner* — Manuel L Barbee
(74) *Attorney, Agent, or Firm* — Michael A. Glenn; Perkins Coie LLP

(57) ABSTRACT

A system for determining a position of a moving object is described, having: an arrangement having at least three general lighting LEDs, wherein each of the general lighting LEDs is implemented to transmit one light signal each with a transmission time information and a transmitter information, wherein the wavelength ranges of the general lighting LEDs for the signal transmission overlap, wherein the transmitter information enables at least a determination of a position of the respective general lighting LEDs and the transmission time information is information on a point in time when the respective signal was transmitted; a light sensor mounted to the moving object and implemented to receive the light signals and allocate one signal receive time each; and an evaluation unit which is implemented to determine the position of the object based on the transmitter information, the transmission time information and the receive time information.

20 Claims, 5 Drawing Sheets

(56) References Cited

U.S. PATENT DOCUMENTS

2009/0251313 A1    10/2009   Perkins et al.
2010/0070064 A1    3/2010   Tseng et al.
2010/0208236 A1*   8/2010   Damink et al. .............. 356/5.09
2010/0254714 A1    10/2010   Jamett et al.

FOREIGN PATENT DOCUMENTS

EP         2391905      12/2011
JP         2010-535335   11/2010
WO    WO 2010085877 A1 *   8/2010

OTHER PUBLICATIONS

Oseguera, Oso, "LEDs for Avoiding Traffic Accidents", retrieved online from url: http://www.greentechmedia.com/articles/read/leds-for-avoiding-traffic-accidents, Jul. 1, 2010, 2 pages.

* cited by examiner

SYSTEM AND METHOD FOR DETERMINING A POSITION OF A MOVABLE OBJECT, ARRANGEMENT OF GENERAL LIGHTING LED AND LIGHT SENSOR FOR A POSITION DETERMINATION OF A MOVABLE OBJECT

CROSS-REFERENCE TO RELATED APPLICATIONS

This application claims priority from German Patent Application No. 102010031629.6-55, which was filed on Jul. 21, 2010, and is incorporated herein in its entirety by reference.

BACKGROUND OF THE INVENTION

Embodiments of the present invention relate to systems and methods and their components for position determination of a movable object, and in particular to a position determination by means of light emitting diodes (LED) and corresponding light sensors.

Light emitting diodes (LEDs) gain ever more popularity. More and more, LEDs also replace conventional illuminants, like for example thermal emitters (light bulbs, etc.) and other illuminants, for example generating lights by exciting gases. LEDs enable a fast data transmission by modulation of the excitation current of the LEDs. Thus, the LEDs are substantially different from the above-mentioned conventional illuminants also with respect to their serviceability and fields of use.

A technology operating in the visible range of light is the so-called "Visual Light Communication" (VLC) which uses light in the visible wavelength range (approximately 400 nm to 800 nm) for an optical data transmission. The VLC technology may further also be used for position finding purposes. Thus, US 2009/0171571 A1 describes a VLC-based navigation system, wherein four VLC transmitters are on the one hand coupled to a corresponding lamp module each in the form of an LED and on the other hand to a navigation server. For location determination, the lamp modules transmit so-called pilot signals which the mobile device receives. The determination of the position of the mobile device is then executed by a triangulation, either by the navigation server or by the mobile terminal device itself. For the transmission of the pilot signals, the VLC-based navigation system uses lamp modules with RGB-LED (Red-Green-Blue), each comprising three light emitting diodes of different colors with the colors red, green and blue and which combine their light so that all in all white light is generated. Here, the different lamp modules generate the white light each by a different combination of red, green and blue light wavelengths and the pilot signals of the different RGB-LEDs are correspondingly transmitted in different wavelengths. The mobile device comprises four photo detectors which receive and evaluate one of those different wavelength ranges each by means of different filters.

SUMMARY

According to an embodiment, a system for determining a position of a moving object may have an arrangement having at least three general lighting LEDs, wherein a first general lighting LED of the at least three general lighting LEDs is implemented to transmit a first light signal having a first transmission time information and a first transmitter information in a first wavelength range, wherein the first transmitter information enables at least a determination of a position of the first general lighting LED and the first transmission time information is information on a point in time when the first signal was transmitted, wherein a second general lighting LED of the at least three general lighting LEDs is implemented to transmit a second light signal having a second transmission time information and a second transmitter information in a second wavelength range, wherein the second transmitter information enables at least a determination of a position of the second general lighting LED, and the second transmission time information is information on a point in time when the second signal was transmitted, wherein a third general lighting LED of the at least three general lighting LEDs is implemented to transmit a third light signal having a third transmission time information and a third transmitter information in a third wavelength range, wherein the third transmitter information enables at least a determination of a position of the third general lighting LED and the third transmission time information is information on a point in time when the third signal was transmitted, and wherein the first wavelength range, the second wavelength range and the third wavelength range at least partially overlap in an overlapping range and a light sensor mounted to the moving object and implemented to receive the first to third light signals in the overlapping range and allocate a first signal receive time to the first light signal, allocate a second signal receive time to the second light signal and a third signal receive time to the third light signal, and an evaluation unit which is implemented to determine the position of the object based on the first to third transmitter information, the first to third transmission time information and the first to third receive time information.

According to another embodiment, an arrangement of at least three general lighting LEDs for a position determination of a moving object with a light sensor may have a first general lighting LED having a first memory in which a first position of the first general lighting LED is stored and which is implemented to transmit a first light signal, having first transmission time information and the first position in a first wavelength range; a second general lighting LED having a second memory in which a second position of the second general lighting LED is stored and which is implemented to transmit a second light signal having second transmission time information and the second position in a second wavelength range; a third general lighting LED having a third memory in which a third position of the third general lighting LED is stored and which is implemented to transmit a third light signal having third transmission time information and the third position in a third wavelength range, and wherein the first wavelength range, the second wavelength range and the third wavelength range at least partially overlap in an overlapping range.

According to another embodiment, a system for determining a position of a moving object may have an arrangement having at least three general lighting LEDs, wherein a first general lighting LED of the at least three general lighting LEDs is implemented to transmit a first light signal having a first transmission time information and a first transmitter information in a first wavelength range, wherein the first transmitter information enables at least a determination of a position of the first general lighting LED and the first transmission time information is information on a point in time when the first signal was transmitted, wherein a second general lighting LED of the at least three general lighting LEDs is implemented to transmit a second light signal having a second transmission time information and a second transmitter information in a second wavelength range, wherein the second transmitter information enables at least a determination of a position of the second general lighting LED, and the second transmission time information is information on a point in time when the second signal was transmitted, wherein a third general lighting LED of the at least three general lighting LEDs is implemented to transmit a third light signal having a third transmission time information and a third transmitter information in a third wavelength range, wherein the third transmitter information enables at least a determination of a position of the third general lighting LED and the third transmission time information is information on a point in time when the third signal was transmitted, and wherein the first wavelength range, the second wavelength range and the third wavelength range at least partially overlap in an overlapping range; a receiver which is implemented to receive a signal having the first to third transmitter identification, the first to third transmission time information and a first to third receive time information, or to receive a signal having the first to third transmitter identification and time information determined based on the first to third transmission time information and the first to third receive time information, wherein a first receive time information is information on a point in time when the first light signal was received by a light sensor mounted to the moving object, wherein a second receive time information is information on a point in time when the second light signal was received from the light sensor mounted to the moving object, and wherein a third receive time information is information on a point in time when the third light signal was received from the light sensor mounted to the moving object; and a memory in which the first transmitter identification and a first position of the first general lighting LED associated with the same is stored, in which the second transmitter identification and a second position of the second general lighting LED associated with the same is stored, and in which the third transmitter identification and a third position of the third general lighting LED associated with this third transmitter identification is stored; and an evaluation unit which is implemented to determine the position of the moving object based on the first to third transmitter information and these associated first to third positions of the first to third general lighting LEDs, the first to third transmission time information of the first to third receive time information or based on the time information determined based on the first to third transmitter time information and the first to third receive time information.

Another embodiment may have a light sensor for a position determination of a moving object, when the light sensor is mounted to the moving object, wherein the light sensor is implemented to receive a first light signal of a first general lighting LED having a first transmitter identification and a first transmission time information in a first wavelength range, and to allocate a first receive time information to the first light signal to receive a second light signal of a second general lighting LED having a second transmitter identification and a second transmission time information in a second wavelength range and to allocate a second receive time information to the second light signal, and to receive a third light signal from a third general lighting LED having a third transmitter identification and a third transmission time information in a third wavelength range and to allocate the third receive time information to the third light signal and to provide the first to third receive time information for position determination, wherein the first wavelength range, the second wavelength range and the third wavelength range at least partially overlap in an overlapping range.

According to another embodiment, a system for determining a position of a moving object may have an arrangement of at least three general lighting LEDs, wherein a first general lighting LED of the at least three general lighting LEDs is implemented to transmit a first pulse-type light signal in a first wavelength range at a first transmission time, wherein a second general lighting LED of the at least three general lighting LEDs is implemented to transmit a second pulse-type light signal in a second wavelength range at a second transmission time having a first transmission time difference at the first transmission time, wherein a third general lighting LED of the at least three general lighting LEDs is implemented to transit a third pulse-type light signal in a third wavelength range at a third transmission time having a second transmission time difference at the first transmission time, wherein the first to third pulse-type light signals have an identical pulse-type form, and wherein the first wavelength range, the second wavelength range and the third wavelength range at least partially overlap in an overlapping range; a light sensor mounted to the moving object and implemented to receive the first to third light signal in the overlapping range and generate a receive signal by means of overlaying the first to third light signal; and an evaluation unit which is implemented to control the second general lighting LED and/or the third general lighting LED based on an evaluation of the form of the receive signal such that the second transmission time and/or the third transmission time are shifted with respect to the first transmission time such that the first to third light signal are simultaneously received by the light sensor and the evaluation unit is further implemented, based on a position of the first general lighting LED, a position of the second general lighting LED, a position of the third general lighting LED and the first and/or the second transmission time difference, to determine the position of the moving object.

According to another embodiment, a system for determining a position of a moving object may have a general lighting LED mounted to the moving object and implemented to transmit a light signal having transmission time information and transmitter information, wherein the transmitter information enables at least an allocation of the signal to the moving object, and the transmission time information is information about a point in time when the light signal was transmitted; an arrangement of at least three light sensors, wherein a first light sensor of the at least three light sensors is arranged at a first position and is implemented to receive the light signal and to allocate a first signal receive time to the light signal, and wherein a second light sensor of the at least three light sensors is arranged at a second position and is implemented to receive the light signal and to allocate a second signal receive time to the light signal, and wherein a third light sensor is arranged at a third position and is implemented to receive the light signal and allocate a third receive time to the light signal; and an evaluation unit which is implemented to determine the position of the object based on the transmitter information, the transmission time information, the first to third receive time information and the first to third positions of the light sensors.

According to another embodiment, a method for determining a position of a moving object may have the steps of transmitting a first light signal having a first transmission time information and a first transmitter information in a first wavelength range, by a first general lighting LED, wherein the first transmitter information enables at least a determination of a position of the first general lighting LED and the first transmission time information is information about a point in time when the first signal was transmitted; transmitting a second light signal having a second transmission time information and a second transmitter information in a second wavelength range by a second general lighting LED, wherein the second transmitter information enables at least a determination of a position of the second general lighting LED and the second transmission time information is information about a point in time when the second signal was transmitted; transmitting a third light signal having a third transmission time information and a third transmitter information in a third wavelength range by a third general lighting LED, wherein the third transmitter information enables at least a determination of a position of the third general lighting LED and the third transmission time information is information about a point in time when the third signal was transmitted, wherein the first wavelength range, the second wavelength range and the third wavelength range at least partially overlap in an overlapping range; receiving the first to third light signals in the overlapping range by a light sensor mounted to the moving object; allocating a first signal receive time to the first light signal; allocating a second signal receive time to the second light signal; allocating a third signal receive time to the third light signal; and determining the position of the object based on the first to third transmitter information, the first to third transmission time information and the first to third receive time information.

According to another embodiment, a method for determining a position of a moving object may have the steps of transmitting a first pulse-type light signal in a first wavelength range by a first general lighting LED at a first transmission time; transmitting a second pulse-type light signal in a second wavelength range by a second general lighting LED at a second transmission time having a first transmission time difference to the first transmission time; transmitting a third pulse-type light signal in a third wavelength range by a third general lighting LED at a third transmission time having a second transmission time difference to the first transmission time, wherein the first to third pulse-type light signal have an identical pulse-like form and wherein the first wavelength range, the second wavelength range and the third wavelength range at least partially overlap in an overlapping range; receiving the first to third light signals in the overlapping range by a light sensor mounted to the moving object; generating a receive signal by means of overlaying the first to third light signals; and controlling the second general lighting LED and/or the third general lighting LED based on an evaluation of a form of the receive signal such that the second transmission time and/or the third transmission time are shifted with respect to the first transmission time such that the first to third light signals are received simultaneously by the light sensor; determining the position of the moving object based on a position of the first general lighting LED, a position of the second general lighting LED, a position of the third general lighting LED and the first and/or the second transmission time difference.

According to another embodiment, a method for determining a position of a moving object may have the steps of transmitting a light signal with a transmission time information and a transmitter information by a general lighting LED mounted to the moving object, wherein the transmitter information enables at least an allocation of the signal and the transmission time information T4S is information on a point in time when the light signal was transmitted; receiving the light signal by a first light sensor arranged at a first position; and allocating a first signal receive time to the light signal; receiving the light signal by a second light sensor arranged at a second position, and allocating a second signal receive time to the light signal; receiving the light signal by a third light sensor arranged at a third position; and allocating a third signal receive time to the light signal; determining the position of the object based on the transmitter information, the transmission time information, the first to third receive time information and the first to third position of the light sensors.

According to another embodiment, a computer program may have a program code for executing one of the above mentioned methods, when the computer program is executed on a computer.

Embodiments of the present invention, for example, provide a system for determining a position of a moving object with an arrangement of at least three general lighting LEDs, wherein a first general lighting LED of the at least three general lighting LEDs is implemented to transmit a first light signal comprising first transmission time information and first transmitter information in a first wavelength range, wherein the first transmitter information enables at least a determination of a position of the first general lighting LED and the first transmission time information is information on a point in time when the first signal was transmitted, wherein a second general lighting LED of the at least three general lighting LEDs is implemented to transmit a second light signal comprising a second transmission time information and a second transmitter information in a second wavelength range, wherein the second transmitter information enables at least a determination of a position of the second general lighting LED and the second transmission time information is information on a point in time when the second signal was transmitted, wherein a third general lighting LED of the at least three general lighting LEDs is implemented to transmit a third light signal comprising a third transmission time information and a third transmitter information in a third wavelength range, wherein the third transmitter information enables at least a determination of a position of the third general lighting LED and the third transmission time information is information on a point in time when the third signal was transmitted, and wherein the first wavelength range, the second wavelength range and the third wavelength range at least partially overlap in an overlapping range. The system further comprises a light sensor mounted to the moving object and implemented to receive the first to third light signal in the overlapping range and to allocate a first signal receive time to the first light signal, a second signal receive time to the second light signal and a third signal receive time to the third light signal. Apart from that, an embodiment of the system comprises an evaluation unit which is implemented to determine the position of the object based on the first to third transmitter information, the first to third transmission time information and the first to third receive time information.

Further embodiments include parts of the system, e.g. the arrangement of the at least three general lighting LEDs, the light sensor and/or the evaluation unit.

Here, the term "general lighting LED" includes all LEDs which are designed and used for the purpose of general lighting of an environment in the visible wavelength range of the light spectrum, so that, for example, people or other living beings may better orientate themselves and move themselves there. The environment here is both open and closed spaces and areas, i.e. for example buildings and rooms and corridors therein or also free spaces. Different to that are LEDs for technical lighting purposes, which are designed and used for a specific technical lighting function (that is a function which does not serve general lighting), for example LEDs for the illumination of microscopes and the samples to be examined or lasers for a distance or position determination.

General lighting LEDs may thus, for example, be fluorescence LEDs or RGB LEDs which are implemented to generate visible light for general illumination purposes. Fluorescence LEDs generate the desired light in the visible wavelength range by a combination of LEDs and suitable fluorescence layers irradiated by the LEDs. RGB LEDs generate the desired light in the visible wavelength range by a suitable combination of LEDs of different colors. General lighting LEDs (fluorescence LEDs and RGB LEDs) implemented to generate white light are also referred to as white light LEDs. Embodiments of the general lighting LEDs are not restricted to generating white light (warm or cold), however, but may also generate any other shade, for example to generate a so-called "mood lighting", e.g. pastel shade colored lights (e.g. pink colored or aquamarine light).

Embodiments of the invention for example use fluorescence LEDs as general lighting LEDs, for example white standard LEDs which generate the white light by means of a combination or mixture of a directly generated light portion and a light portion generated indirectly via a fluorescence layer. One example for such fluorescence LEDs are white standard LEDs comprising a blue LED to generate a direct blue light portion and simultaneously excite a fluorescence layer with the blue light to generate further light portions comprising longer waves to thus, by a mixture of the directly and indirectly generated portions, generate a white light spectrum. By the use of other fluorescence materials, also other light tones apart from white light tones may be generated, for example pastel shade colored light.

Fluorescence LEDs are clearly cheaper than RGB LEDs. Apart from that, fluorescence LEDs are by far more common, both for general illumination purposes and also with respect to their use in consumer products. Apart from that, by the use of the fluorescence LEDs and a light wavelength range for signal transmission common to all LEDs and light sensors, embodiments of the invention enable not only savings due to the low costs of the individual fluorescence LEDs compared to the individual RGB LEDs, but also because only one single light sensor is needed, as in contrast to that the above described position finding systems having four different light wavelengths also need four different light sensors. Embodiments of the invention thus use fluorescence LEDs which are of the same construction and/or generally generate light in the same wavelength range or at least light having basically overlapping wavelength ranges.

Further embodiments restrict the spectrum at the detector or light sensor to the directly generated light portion, for example the blue excitation wavelength in a range from 420 nm to 490 nm to enable a more exact position finding. Such embodiments are based on the finding that the absorption of the direct radiation and new emission of the direct radiation or the indirect light portion as compared to the directly generated light portion causes delays in the range of some nanoseconds, and thus the signal edges of the modulated LED light become temporarily blurred, i.e. washy. By the evaluation of the directly generated light portions, for example the blue light portions, a generation and detection of temporally sharper defined signal edges becomes possible and thus also, as mentioned above, a temporally more accurate determination of the signal edges, or generally a temporally more accurate resolution of the signals and signal courses becomes possible and then again a more exact position determination. Apart from that, this also enables a higher data transmission rate.

Accordingly, for example all fluorescence LEDs of the position determination system transmit in the same blue wavelength range or generally in the same wavelength range of the directly generated light portion given by the design of the fluorescence LEDs, and the light sensor basically only evaluates this wavelength range or light portion, for example by filtering the white light through a corresponding filter, e.g. a blue filter which is basically only permeable for blue light portions.

Further embodiments of the invention, for example, use RGB-LEDs as general lighting LEDs, each comprising different LED elements, each generating light or a light portion of a different wavelength range, i.e. a different color in the visible light spectrum, wherein the LED elements and their specific color light portions are selected so that a combination or mixture of these light portions results in the desired light or the desired light tone, e.g. white light. The LED elements of the RGB LEDs directly generate the respective color light portion, i.e. without a fluorescence layer. With RGB LEDs the white light is mixed from a combination of a red, a green and a blue directly generated light portion. Other light tones or light of a different color, e.g. the above mentioned pastel shade colored light may, for example, be generated by a mixture of directly generated red, green and blue light portions of other wavelengths. With embodiments of the invention, in which RGB LEDs are used, for example the excitation current of only one of the LED elements is modulated to generate the signal for locating. With an arrangement of general lighting LEDs with RGB LEDs, all three (or more, if more than three general lighting or RGB LEDs are used for position determination) for example transmit the signal for the position determination in the same or at least an overlapping wavelength range, for example in the green, red or blue wavelength range. Advantageously, all RGB LEDs transmit the position signal only in the blue wavelength range (420 nm to 490 nm), as the same enable a more accurate temporal resolution and thus a more accurate locating due to the higher frequency.

Embodiments of the present invention with RGB LEDs as general lighting LEDs may thus use RGB LEDs which are, for example, of the same design and/or in the same wavelength range or at least generate light with basically overlapping wavelength ranges. Thus, the costs prevented by the use of different RGB LEDs, as for example described in the above mentioned conventional technology, may be prevented both in the production and also in storage and maintenance. On the other hand, the system or the receiver additionally needs no sensor which filters in the light in four different wavelength ranges by corresponding different filters and evaluates the same but, as the wavelength ranges of the at least three RGB LEDs used for signal transmission for position determination overlap in an overlapping wavelength range, it needs only one light sensor which receives the light in the overlapping range and for example filters out other wavelength ranges in the visible and/or non-visible wavelength range, so that only the signals in the overlapping range are evaluated.

Further embodiments may, for example, also use a combination of one or several RGB LEDs and one or several fluorescence LEDs, wherein the RGB LEDs and the fluorescence LEDs are implemented so that they transmit the signals for the position determination in an overlapping wavelength range, for example the RGB LEDs by means of their blue LED elements in a blue wavelength range and the fluorescence LEDs also in their directly generated blue wavelength range.

For position determination, for example, run time methods (TOA—Time of Arrival) or run time difference methods (TDOA—Time Difference of Arrival) are used.

Further embodiments of the present invention use multiplexing methods, like for example time multiplex or code multiplex methods to differentiate the light signals of the different fluorescence LEDs transmitted in the same wavelength range.

Other embodiments using the overlaying of the signals at the receiver (e.g. constructive interference) again delay the transmission times of the individual signals such that the same arrive at the light sensor or are received by the same at the same time or at least basically at the same time despite the different path lengths, and determine the position of the moving object by means of the transmission time differences needed for this.

Further, embodiments of the present invention enable a simple extension by additional fluorescence LEDs and thus an increase of the location resolution or accuracy of position determination. This applies both for the embodiments based on a constructive interference and also for the embodiments using a time multiplex method.

In conventional systems, the functionalities of illumination, data transmission and locating are usually realized in separate systems. Illumination for example by conventional illuminants, but also LEDs, locating and data communication, for example via radio technologies, partially even different radio technologies for location and communication. Locating here gains ever more importance as for example in logistics distances or paths are not defined a priori any more but are optimized flexibly. Products are implemented and scanned in conventional systems, for example using barcodes, as soon as they reach a location. A permanent locating is for example realized on the basis of radio technology, for example by means of RFID (Radio Frequency Identification). These approaches, however, only enable a punctual detection of the stream of goods and may not monitor the same permanently and in real time.

Embodiments of the present invention enable the integration of these three functionalities, illumination, data transmission and locating, into a system. In contrast to the above described RGB LED based locating system, embodiments of the present invention (with fluorescence LEDs and/or RGB LEDs) enable an integration of these three functionalities with only one transmitter and receiver pair.

Compared to conventional systems, in which the three above mentioned functionalities are realized in separate systems, embodiments of the present invention for example need no additional hardware components compared to purely optical data transmission systems. From this, clear cost advantages and simple possibilities of technically realizing locating and security features result without affecting the size of devices.

The combination of the data transmission with light and the position determination with light additionally enable new security functions as such solutions enable to make data streams available specifically at freely defined locations based on the visual contact needed for communication between LED and light sensor and to cut off non-admitted locations from data streams. Thus, the security against eavesdropping of the communication may be substantially increased, as the location of the receiver may be determined from the optical signals with a high accuracy. In other words, embodiments of the present invention enable a clearly increased security in communication, as the transmission protocols may provide data specifically at defined locations.

In further embodiments, for example, in an airplane the illumination may be used to address the entertainment systems in the seats. Simultaneously, the seat may be identified and it may be detected whether the seats were brought into an upright position for starting and landing.

With stationary and mobile devices, a theft protection may be realized, wherein the use is only enabled in a defined space. A universal measurement device which is needed in manufacturing securely remains at its intended place of use as it becomes useless for other locations.

Inventive methods and systems may also be used in the industrial environment in manufacturing or in logistics. In museums, audio systems may enable freely planned tours and be developed interactively. In security technology, data connections secure against eavesdropping may be set up which may also be limited within the reach of the optical radiation. Thus, for example solutions may be set up in the field of defense.

BRIEF DESCRIPTION OF THE DRAWINGS

In the following, embodiments of the present invention are explained in more detail with reference to the accompanying drawings, in which.

DETAILED DESCRIPTION OF THE INVENTION

Figure 1:
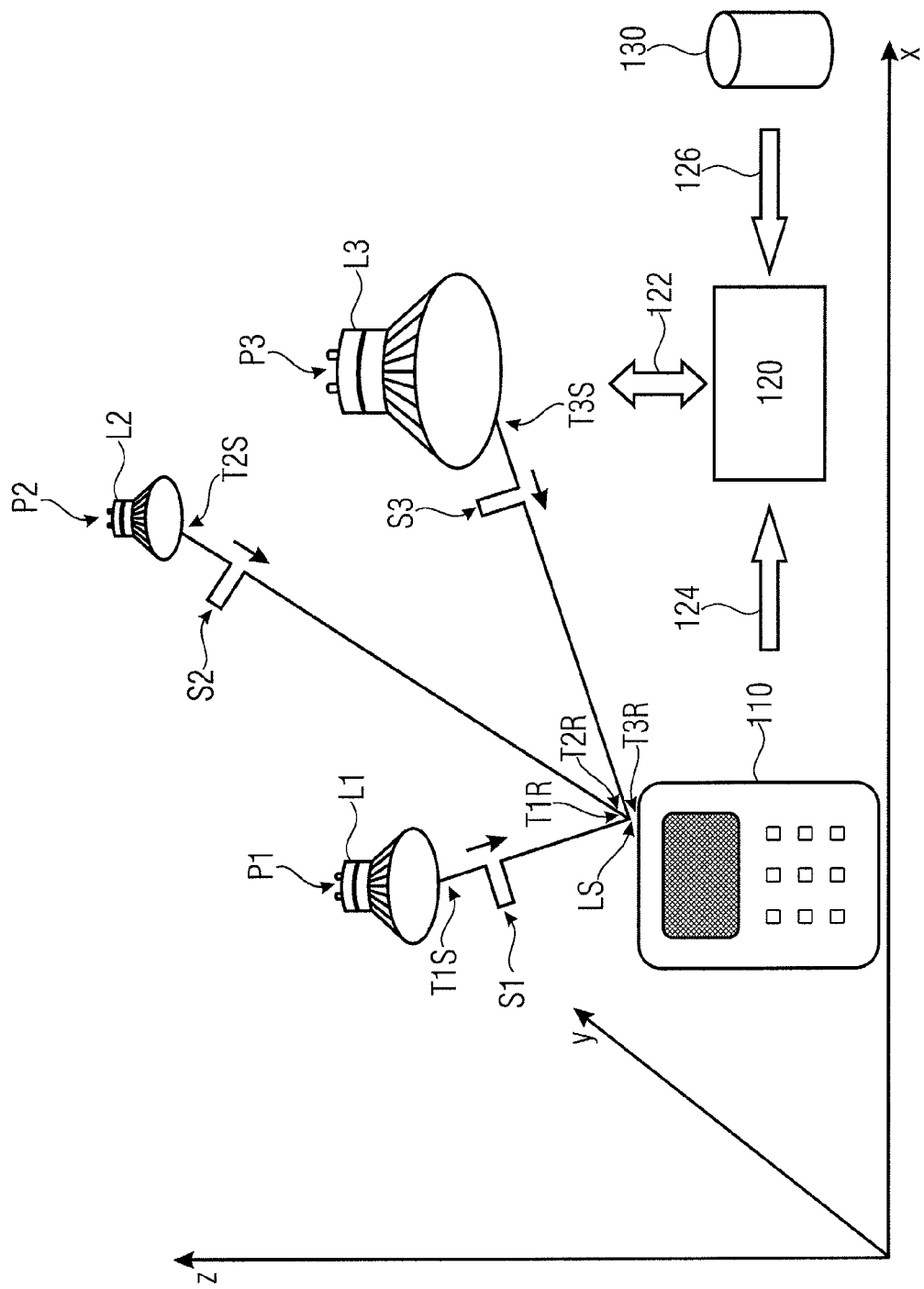
FIG. 1 shows a schematical illustration of a system for determining a position of a moving object by means of at least three fluorescence LEDs and a light sensor mounted at the moving object.

In the following description of the embodiments, for like or seemingly like elements the same reference numerals are used.

In the following, embodiments with fluorescence LEDs as general lighting LEDs are described. The explanations, however, apply accordingly for other embodiments for example with RGB LEDs as general lighting LEDs.

FIG. 1 shows a schematical illustration of an embodiment of a system for determining a position of a moving object 110, wherein the system comprises an arrangement of three fluorescence LEDs L1, L2 and L3, a light sensor LS mounted to the moving object and an evaluation unit 120. Optionally, the system may also comprise a data base 130.

The fluorescence LEDs L1 to L3 are, for example, integrated in the ceiling, a wall or other objects of the environment or mounted to the same and each have a defined, known and fixed position P1 to P3. The positions P1 to P3 are different for example to be able to determine the position of the object 110 by means of run time methods. The first fluorescence LED L1 arranged at the first position P1 is implemented to transmit a first light signal S1 at a first transmission time T1S. The second fluorescence LED L2 arranged at the second position P2 is implemented to generate or transmit a second light signal S2 at a second transmission time T2S. The third fluorescence LED L3 arranged at the third position P3 is implemented to transmit a third light signal S3 at a third transmission time T3S. The signals S1 to S3 are each symbolically illustrated by a pulse (see FIG. 1) and are not restricted to pulses but may be generally any for example correspondingly modulated signals.

The fluorescence LEDs L1 to L3 are additionally synchronized such that they have a common time base, e.g. a common absolute time base in the form of a time stamp, to for example enable a simultaneous transmission or defined time-offset or delayed transmission of the first to third signal S1 to S3 and/or when the first to third signals S1 to S3 are transmitted at different times to be enable to determine a corresponding difference or delay of the transmission times based on the known transmission time T1S to T3S.

The light sensor 110 is implemented to receive the first light signal Si at a first receive time T1R, to receive the second light signal S2 at a second receive time T2R and to receive the third light signal S3 at a third receive time T3R. The first to third signal receive times may also be referred to as a first to third signal receive time T1R to T3R.

The evaluation unit 120 is generally implemented to determine the position of the object 110 based on the first to third signals S1 to S3 and the positions P1 to P3 of the fluorescence LED L1 to L3. The evaluation unit 120 may be implemented to exchange data with the fluorescence LEDs L1 to L3 (e.g. for a control of L1 to L3 by the evaluation unit and/or for a synchronization, see arrow 122), receive data from the light sensor LS (see arrow 124) and/or call data from the data base (see arrow 126, e.g. to read out a position P1 to P3 of a fluorescence LED L1 to L3 associated with an identification or transmitter information).

According to a first embodiment, the first fluorescence LED L1 is further implemented to transmit the first light signal Si with a first transmission time information, e.g. the first transmission time T1S and a first transmitter information, e.g. the position P1 of the first fluorescence LED or generally information which enables at least the determination of the position P1 of the first fluorescence LED. The same applies for the second fluorescence LED L2 and the third fluorescence LED L3. In such an embodiment, the light sensor LS may further be implemented to allocate the first signal receive time T1R to the received first signal S1, for example in the form of a data set or an index, to allocate the corresponding second receive time T2R to the second received signal S2 and to allocate the corresponding third receive time T3R to the third receive signal S2. With such embodiments, the evaluation unit 120 may then further be implemented to determine the position of the object 110 based on the first to third transmitter information, the first to third transmission time information T1S to T3S and the first to third receive time information T1R to T3R.

For example, embodiments of the evaluation unit 320 may be implemented to determine a measure for the run time of the first signal S1 from the first fluorescence LED L1 to the moving object 110 or in more detail to the light sensor LS based on the first transmission time information T1S and the first receive time information T1R, and for example determine the run time directly by differentiation, when the light sensor LS is also synchronized with the fluorescence LEDs L1 to L3 such that the same has a common time base with the fluorescence LEDs. Accordingly, the evaluation unit 110 may further determine a run time or at least a run time measure for the second signal S2 and the third signal S3. As the run time is proportional to the optical distance of the respective fluorescence LED, i.e. for example the distance between the first fluorescence LED L1 and the moving object 110 or the light sensor LS is proportional to the run time of the first signal S1, and the propagation speed of the signal is known, the position of the moving object 110 or more accurately representatively the position of the light sensor LS, may for example be determined by trilateration or multilateration when more than three fluorescence LEDs are available for location determination. Theoretically, using three fluorescence LEDs or three run time measurements, the position of the object in the three-dimensional space (see x, y, z coordinate system in FIG. 1) may be uniquely determined. As, however, in practice measurements inaccuracies occur in run time determination, by an increase of the number of fluorescence LEDs and accordingly an increase of the run time measurements of different positions, the accuracy of position determination may be increased. Such trilateration or multilateration methods are referred to as time of arrival methods as well (TOA methods).

If the light sensor LS is not synchronized with the three (or more) fluorescence LEDs L1 to L3 or may not be synchronized with the same, instead of the above mentioned trilateration or multilateration methods hyperbola-based location determination methods may be used. With the same, due to the missing synchronization, the run time of the respective signal may not be gathered directly, e.g. the run time of the first signal S1 via differentiation between the transmission time T1S and the receive time T1R, but only in pairs with another signal, a run time difference may be gathered between the run time, for example of the first signal S1 and the run time of the second signal S2. The point of equal time differences are here located on hyperboloids. By the use of at least three fluorescence LEDs L1 to L3, accordingly three pairs of fluorescence LEDs, i.e. L1 and L2, L1 and L3 and L2 and L3 may be formed and differences for the signal run times between the first signal S1 and the second signal S2, between the first signal S1 and the third signal S3 and between the second signal S2 and the third signal S3 may be formed. As also the positions P1 to P3 are known to the fluorescence LED, based on these position functions and the run time differences corresponding three hyperboloids may be defined whose intersection is the position of the light sensor LS or the moving object 110. Such methods are also referred to as time difference of arrival methods (TDOA methods). Also here, for a more accurate position determination, more than three fluorescence LEDs may be used to be able to determine more run time differences and thus ambiguities in position determination may be prevented, for example caused by measurement inaccuracies based on over-determination, i.e. the position of the object may be determined more accurately.

The positions P1 to P3 of the fluorescence LED may here directly be transmitted in the signal S1 to S3 or, for example, be stored in a data base or generally in a storage 130 and be determined via a corresponding transmitter identification which is specific and unique for each transmitter or each fluorescence LED. Accordingly, many implementations result for the implementation of the invention depending on what information is transmitted with the signals S1 to S3 and/or where the evaluation takes place.

For example, the evaluation unit 120 may also be attached to the moving object, integrated in the light sensor or be integrated in the moving object together with the light sensor. Alternatively, the evaluation unit 120 may also not be mounted in the or at the moving object but in the environment, for example in the proximity of the fluorescence LED, or at any other location. Apart from that, partial tasks or partial functionalities of the evaluation means may be distributed to different partial units, wherein some of these partial units may be mounted to the object and others may be arranged in other locations independent of and remote from the moving object.

For the case that the evaluation unit 120 is arranged at or in the moving object, the light sensor LS may be implemented to output the first to third transmission time information, T1S to T3S, the first to third receive transmission information T1R to T3R and the first to third transmitter information (e.g. transmitter ID which enables at least an allocation of a position for the position determination or position of the corresponding fluorescence LED directly) to the evaluation unit (see arrow 124 in FIG. 1), which in turn determines the position based thereon, for example by means of multilateration methods or hyperbola-based methods or other suitable methods. The position may then for example be illustrated in text form or graphically on a display of the moving object, for example a mobile terminal device, and/or be used via a further communication interface for a central further processing of the position data. Thus, for example, the light sensor LS, or in case the evaluation unit 120 is also mounted to the moving object, may comprise a further unique ID, for example in a storage of the light sensor or the evaluation unit, and pass on this device ID together with the position to a central detection system, which detects and if applicable stores or represents the position for a plurality of moving objects.

In case that one or several of the light signals S1 to S3 only comprise transmitter information in the form of a device ID or fluorescence LED ID, the evaluation unit may, for example be implemented to determine the positions P1 to P3 of the fluorescence LED needed for the position determination of the moving object via a data base or generally a storage 130 in which for each of the fluorescence LED identifications a position is stored. This stored allocation or data base may, for example, be integrated in the evaluation unit 120 or be mounted in a separate unit at the moving object or be connected to the evaluation unit via a further for example contactless interface (see arrow 126 in FIG. 1).

In alternative embodiments, the evaluation unit 120 may also be arranged in any other place or accordingly also the data base 130. In this case, the light sensor LS for example transfers the first to third transmitter information, the first transmission time information and the first to third receive time information via a contactless interface, also referred to as air interface, to the evaluation unit 120, which then determines the position of the object 110 based on these data. Alternatively, the light sensor or a corresponding signal processing unit connected thereto, which is also mounted to the object, may further process the above mentioned information, e.g. determine the run times or run time differences, to transmit this further processed information or only the same to the evaluation unit.

For this communication, the system for example comprises a further transmitter arranged at the moving object or integrated in the same and implemented, to transmit to a corresponding receiver, for example again connected to the evaluation unit 120, via radio technologies (e.g. WLAN=Wireless Local Area Network), monochromatic object transmission technology (e.g. IrDA–Infrared Data Association) or also, like for position determination, in the visible field of light by means of fluorescence LED. The transmission or communication direction from the fluorescence LEDs or generally from the environment to the moving object is also referred to as downlink, while the transmission and communication direction from the moving object to the environment is referred to as uplink.

In further embodiments, the fluorescence LEDs L1 to L3 may further be implemented to generally transmit data, i.e. data which is not connected to position determination, in a down link to the light sensor LS and corresponding downstream data processing units, like e.g. in a mobile terminal device, and to use in the uplink also a fluorescence LED and a corresponding light sensor on the environmental side to transmit data from the moving object or the mobile terminal device to the environment, for example a central logistics or general data detection system or in general to transmit position data and/or other data to other devices, for example servers or other terminal devices. The environmental light sensor needed in this respect may for example be arranged or integrated at or in the fluorescence LEDs or be arranged and/or integrated at other positions of the environment.

Figure 2:
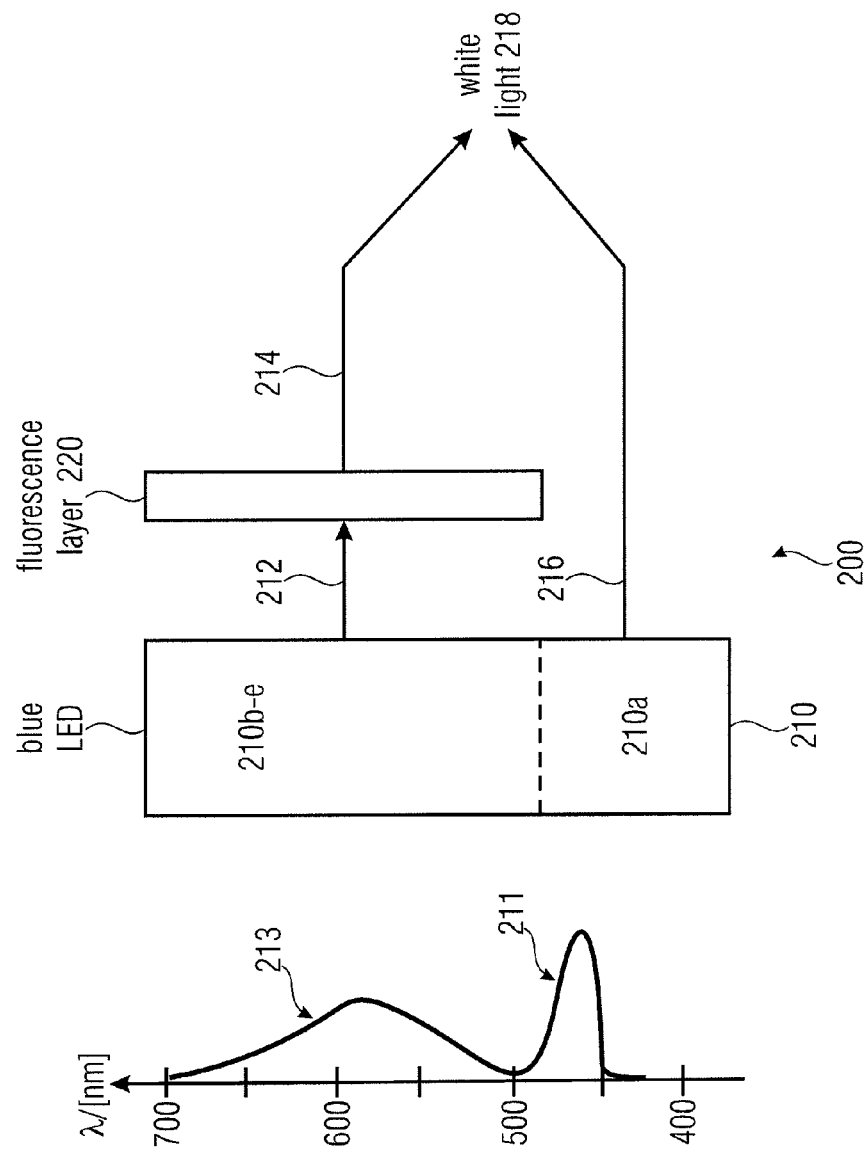
FIG. 2 shows a schematical spectrum of a fluorescence LED and a schematical illustration of the functional principle of the fluorescence LEDs.

FIG. 2 shows a schematic illustration of a functional principle of a fluorescence LED (right side of FIG. 2) and a spectral combination of the white light generated by the fluorescence LED (left side of FIG. 2). The fluorescence LED 200 (for example fluorescence LEDs L1 to L3 of FIG. 1) comprises one or several blue LED elements 210 generating blue light for example in a wavelength range from 450 nm to 500 nm (see reference numeral 211 in FIG. 2), wherein at least a part of this blue light (see reference numeral 212) again excites a fluorescence layer 220 to generate a longer-wave light portion (see wavelength range and reference numeral 213 left in FIG. 2) and give off the same as an indirect light portion 214. This indirect light portion 214 is combined with the directly generated light portion 216 which is not absorbed by fluorescence layer 220 and/or guided past this fluorescence layer 220 in order to generate the white light 218. Such a fluorescence LED 200 which may also be referred to as a white standard LED may however not only use blue LEDs but UV LEDs in addition or instead of the blue UV LED. Here, short-wave light of higher energy, i.e. the blue or UV light, is converted into long-wave light of lower energy. Embodiments of the fluorescence LEDs may comprise different illuminants, and, for example, also different fluorescence materials in the fluorescence layer which generate different indirect light portions. For example, UV LEDs may be used with several different fluorescence materials for the generation of a red, green and/or blue light portion. Typically, however, blue LEDs are only combined with one single illuminant, for example a yellow fluorescent substance/phosphor like CER doped yttrium aluminum garnet. A combination with other fluorescent substances enables the generation of light of different color, like e.g. pastel shade colored light.

The fluorescence LED 220 may for example comprise one single LED element 210 or several LED elements, wherein one LED element or a first number of LED elements is not provided with a fluorescence layer 220 to generate a direct light portion 216, and at least one other LED element or a second plurality of LED elements is provided with the fluorescence layer 220 to generate the indirect light portion 214. In one concrete embodiment, the fluorescence LED 200 for example comprises five blue LED elements 210a to 210e, wherein one LED element 210a comprises no fluorescence layer 220 and generates a direct blue light portion 216, and four further blue LED elements 210b to 210e are provided with a fluorescence layer to generate the indirect non-blue light portion in the visible wavelength range.

As the photons of high energy and short wavelength generated by the blue LED elements 210b to 210e (e.g. blue light in a wavelength range from 420 nm to 490 nm) are absorbed by the fluorescence layer 220, for example made of phosphor, in order to then generate photons of higher wavelengths (e.g. above the blue light spectrum, i.e. higher than 490 nm) and lower energy by spontaneous emission, delays and a substantial increase of the dispersion in the signal propagation result in the modulation of the fluorescence LED 200, which causes delays in a range of a few nanoseconds with respect to the directly transmitted light portions or directly generated photons 216. These delays are disturbing and lead to substantial measurement inaccuracies due to the high propagation speed of the light and the relatively small distances between the fluorescence LEDs and the light sensor or the object 210 as compared to that. By the use of only the directly generated light portion 216 or in other words by the sole evaluation of the directly generated light portions of the white light 218 a higher temporal resolution is possible—with a corresponding speed of the transmitters or modulators and the corresponding detectors or light sensors—and thus, as mentioned above, a more accurate position determination of the light sensor LS or the moving object 110.

The restriction to the directly transmitted light portion 216 may for example be achieved by the fact that upstream from the light sensor LS a corresponding color filter is arranged, for example a blue filter for blue direct light, which basically only lets blue light portions pass and is basically impermeable for other light portions (e.g. five times or ten times more permeable). In this case it is not relevant whether only the directly generated light portion 216 or also the indirectly generated light portions are modulated, for example by the modulation of the excitation currents of all LED elements 210a to 210e or the one LED element in case the fluorescence LED only comprises one LED element 210, as the same may be filtered out by the corresponding filter, as mentioned above.

Alternatively or additionally, for example also only the corresponding LED element which generates the direct light portion 216, for example 210a in FIG. 2, may be modulated or its excitation current may be modulated to cause a restriction to the directly generated light portion 216. The first variant, the use of a corresponding filter at the light sensor, has the advantage that all LED elements may be controlled in the same way and thus existing illumination systems which use fluorescence LEDs and/or communication systems which use fluorescence LEDs for a data transmission in the visible wavelength range may be supplemented in a simple way by the additional functionality of position determination without the design and/or the construction of the actual fluorescence LEDs 200 having to be changed. For an extension of conventional "stupid" illumination LEDs by the position determination functionality and optionally the data functionality, for example an LED control unit is associated with each fluorescence LED. The LED control unit for example comprises a memory in which a device identification is fixedly or changeably stored, which enables a unique allocation or addressing of the fluorescence LEDs and the corresponding LED control unit. Additionally or alternatively the memory may also comprise a position of the fluorescence LED. The LED control unit is connected, via further conventional contactless or contact-based communication interfaces, to other LED control units associated with other fluorescence LEDs, to for example cause a synchronization of the three or more fluorescence LEDs and/or generally exchange data. Further, this LED control unit may be implemented to control the excitation current of the actual fluorescence LEDs, for example modulate the same, to generate the light signal for position determination, or also other light signals for data transmission. Embodiments of the inventive fluorescence LED for example comprise such LED control units. In the following, however, no difference is made between the actual light-generating fluorescence LED and the corresponding LED control unit and both in combination is also referred to as fluorescence LED.

In other words, embodiments of the first fluorescence LED L1 are for example implemented to generate white light 218 by means of mixing or combining a directly generated light portion 216 and a light portion 214 generated indirectly via a fluorescence layer 220 and transmit the first signal S1 simultaneously by modulating an excitation current of the first fluorescence LED L1. The same applies to the embodiments of the second and third fluorescence LEDs L2 and L3. Such fluorescence LEDs thus fulfill at least two functions, i.e. on the one hand the illumination by white or different colored visible light and on the other hand the position determination of the moving object, and may optionally also fulfill the functionality of data transmission.

For the determination of the position, further embodiments of the system used directly generated light portions 214 of the first to third (or more) fluorescence LEDs lying in the same wavelength range and which may thus be separated with a filter from other, for example, disturbing light portions on the light sensor side. This may, for example, be achieved by the fluorescence LEDs L1 to L3 using the same LED elements 210 and/or being fluorescence LEDs of the same construction. To differentiate the light signals S1 to S3 transmitted in the same light wavelength range, the systems according to FIG. 1 may be implemented to use time division multiplexing (TDM), code division multiplexing (CDM) and/or other suitable multiplexing methods.

In embodiments which use code division multiplexing, for example to each fluorescence LED a specific encoding prescription or a specific code is allocated, using which the information to be transmitted, for example the transmitter information and the transmission time information, is spread in order to transmit the same. The light sensor or the demodulator integrated in the light sensor knows the specific codes or encoding prescriptions and may differentiate the light signals S1 to S3 using the same and thus accordingly further process the same.

With embodiments of the system operating with a time division multiplexing, the same wavelength range is temporally divided into so-called time slots which are then allocated to each fluorescence LED. The allocation of the time slots to the fluorescence LEDs may be static or dynamic.

Figure 3:
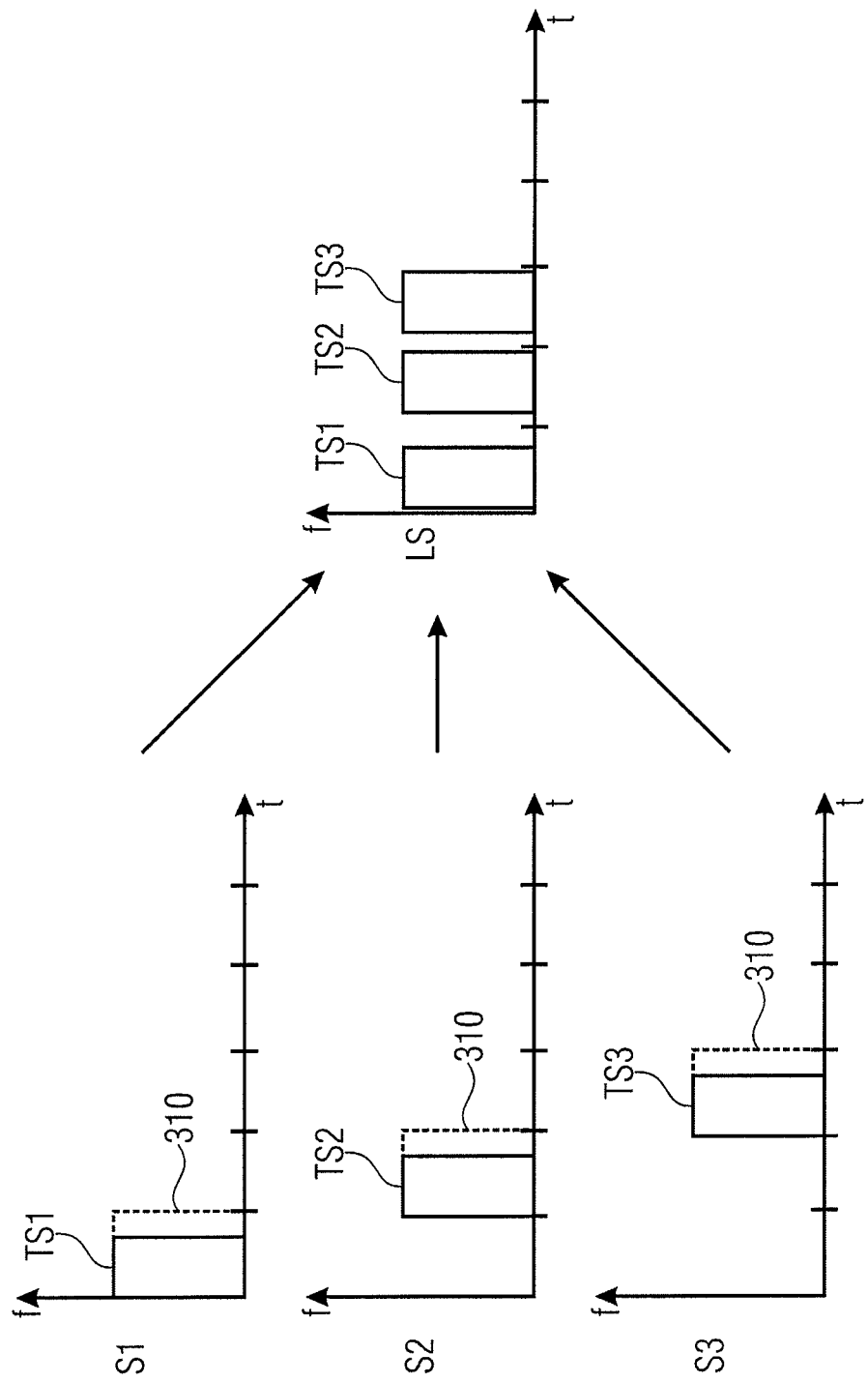
FIG. 3 shows a schematical illustration of a time multiplex method for the signal transmission of three fluorescence LEDs to the light sensor.

FIG. 3 shows a schematic illustration of the time division of the wavelength range or frequency range for the first to third signals S1 to S3 and the signal received from the light sensor (on the right side of FIG. 3). At the top left in FIG. 3, for example, the first light signal S1 is transmitted at a first transmission time T1S, corresponding to a first time slot TS1, or in other words the first light signal SI is transmitted in the first time slot TS1. Accordingly, the second light signal S2 is transmitted in a second time slot TS2 (time slot different from the first time slot), and the third light signal S3 is transmitted in a third time slot TS3 different from the first and second time slot. To prevent a disturbing overlaying of the signals S1 to S3 due to their different runtimes on the light sensor side or the receiver side, a so-called protection time 310 between the first and the second time slot TS1, TS2, between the second time slot and the third time slot TS2 and TS3, etc. is provided. The right hand side of FIG. 3 shows symbolically (not to scale) the time shifts of the signals within the two intervals, where the first signal S1 (TS1 in FIG. 3) comprises the smallest delay or shift within the time raster, as it is closest to the mobile object, the second signal S2 (in FIG. 3 TS2) is shifted farthest to the right in the time raster as it has the greatest distance to the light sensor LS and the third signal S3 (in FIG. 3 TS3) is shifted more than the first signal but less than the second signal within the time structure of the time division multiplexing, as it is further away from the light sensor than the first fluorescence LED but closer than the second fluorescence LED. As both the transmission times T1S to T3S and also T13 to T3R are known, such time division multiplexing may be used both for location determination, for example for lateration methods or hyperbola-based method, and also for a data transmission independent of a position determination to transmit data from the fluorescence LEDs L1 to L3 to the light sensor LS.

A further embodiment of the system for determining a position of a moving object is based on the use of the interference of the light signals S1 to S3 as determines the position of the object or light sensor LS by constructive interference. When the three different sources or fluorescence LEDs transmit synchronous in time, an optimum constructive interference will only occur when the optical path length between the individual fluorescence LEDs L1 to L3 and the receiver, i.e. the light sensor LS, is the same. For the determination of the position of the moving object by means of constructive interference, thus the receive signal of the light sensor resulting from an overlaying of the three light signals S1 to S3 is introduced into a phase locked loop which causes the constructive interference to remain at a maximum. The evaluation of the optimum may be derived from the amplitude and the pulse width of the signal received at the light sensor LS. Also without an identification of the light signals S1 to S3 the system may vary two parameters that each represent a time delay of the otherwise identical transmission streams or transmission signals between the fluorescence LED L1 to the fluorescence LED L2 and between the fluorescence LED L1 and the fluorescence LED L3. This method for the evaluation of the overall signal of the light sensor LS and the corresponding change of the time delays of the individual signals needs a bidirectional data transmission (data transmission in the uplink and the downlink), wherein the back channel or uplink channel may be executed via a fluorescence LED and a corresponding light sensor or via other optical or radio-based contactless transmission methods.

Figure 4:
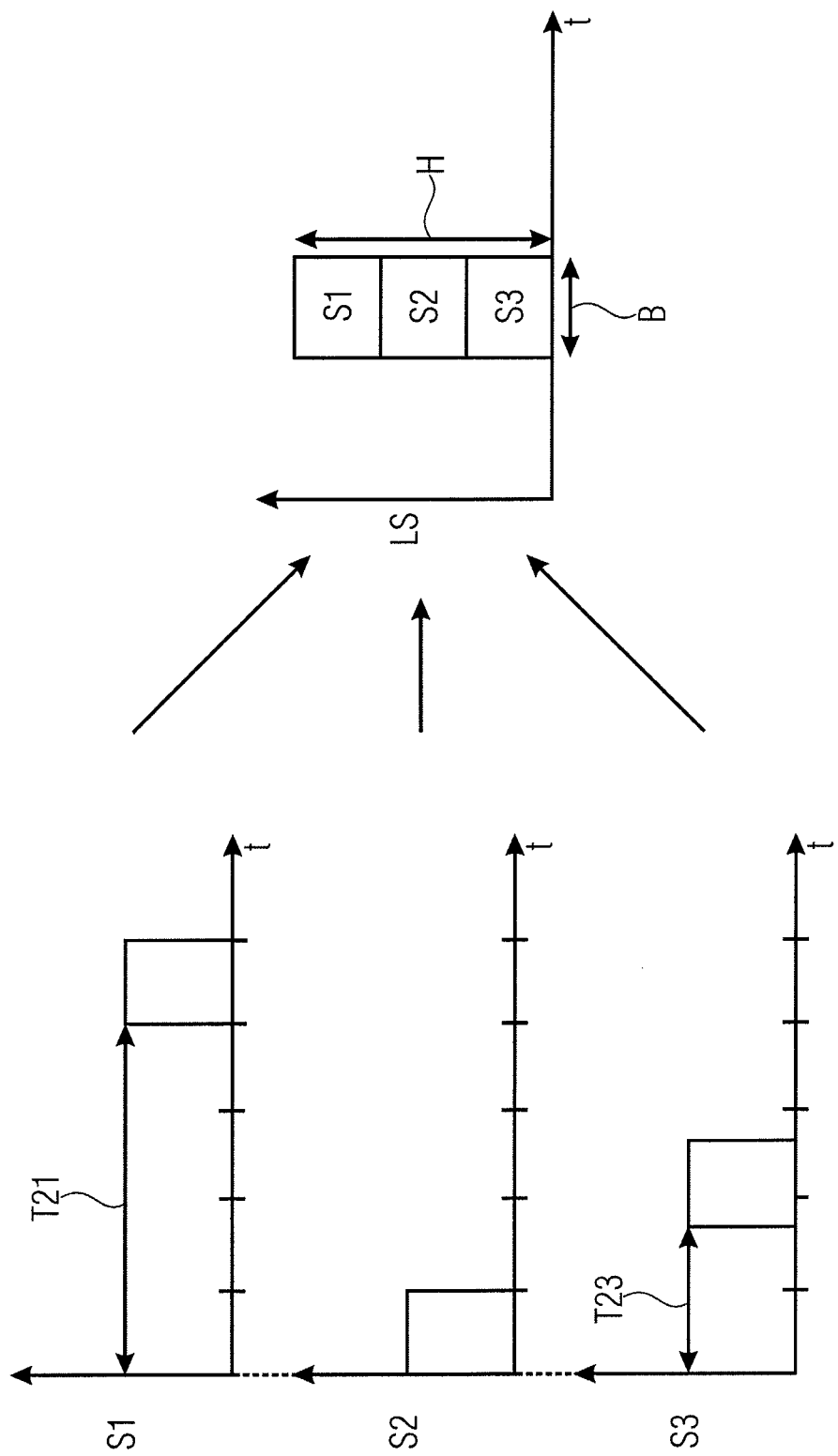
FIG. 4 shows schematical illustrations of the signals transmitted offset in time of the fluorescence LEDs for position determination by means of constructive interference.

FIG. 4 shows a flow diagram of the time delays of the individual signals to achieve an optimum constructive interference with the light sensor LS. The fluorescence LEDs L1 to L3 for example transmit the same signals, for example pulses or pulse shaped signals (illustrated symbolically in FIG. 4 by constant or uniform pulses). As the second fluorescence LED L2 is farthest from the light sensor LS, the same is transmitted first (see S2 in FIG. 4 and the corresponding time beam which is identical for all signals, as the same are synchronized). With a first time difference T23, the third signal S3 is transmitted, as the third fluorescence LED is arranged closer to the light sensor LS than the second fluorescence LED L2, but is further away from the same than the first fluorescence LED L1. As a third signal then with a time shift or a time difference T21 the first signal Si is transmitted. As the time differences T23 and T21 correspond to the runtime differences between the signals S2 and S3 (T23) and between the signals S2 and signal S1 (T21) caused by the different distances, the same arrive at the same time at the light sensor and their amplitude adds up to a maximum height H. The width B of the pulse in this optimum case corresponds to the constructive interference basically of the width of the original individual signals or individual pulses S1 to S3. If the time delay or time difference T21 does not correspond to the run time difference caused by the different distance but is, for example, shorter, then the signal S1 will arrive earlier than the signal S2, correspondingly overlay and increase the width B and reduce the size H. Accordingly, a time difference T21 which is greater than the corresponding run time difference between the signals Si and S2 will cause the first signal S1 to arrive later than the second signal S2 and will thus also increase the width and reduce the height H. The same applies for the time difference T23 with respect to the third signal S3. By iteratively varying the time differences or differences in the transmission times T1S to T3S of the signals S1 to S3, different receive signals result, or in other words, receive signals with difference shapes, widths and heights which may be evaluated to again iteratively vary those time differences or transmission times so that the three signals S1 to S3 simultaneously arrive at the light sensor LS, and thus, as illustrated on the right-hand side in FIG. 4, a receive signal with a maximum height H and a minimum width B results.

In other words, embodiments of the system for determining a position of a moving object as they were explained with reference to FIG. 4, for example, comprise an arrangement of at least three fluorescence LEDs, wherein a first fluorescence LED L1 of the at least three fluorescence LEDs is implemented to transmit a first pulse-type light signal S1 at a first transmission time T1S, wherein a second fluorescence LED L2 of the at least three fluorescence LEDs is implemented to transmit a second pulse-type directional signal at a second transmission time T2S and a third fluorescence LED is implemented to transmit a third pulse-type light signal S3 at a third transmission time T3S. The first to third pulse-type light signals S1 to S3 here advantageously comprise an identical pulse shape or signal shape. The light sensor LS mounted at the moving object 110 is implemented to receive the first to third light signals S1 to S3 and generates a receive signal by means of overlaying the first to third light signals. The evaluation unit 120 is then implemented, based on an evaluation of a shape of the receive signal of the light sensor, to control the second fluorescence LED L2 and/or the third fluorescence LED L3 such that the second transmission time and/or the third transmission time T3S are shifted with respect to the first transmission time TIS by a first time difference T12 or T13 such that the first to third light signal S1 to S3 are basically received simultaneously from the light sensor LS. The evaluation unit 106 is, apart from this, implemented, based on the position P1 of the first fluorescence LED, the position P2 of the second fluorescence LED, the position P3 of the third fluorescence LED and the first and/or second transmission time difference, to determine the position of the moving object.

Figure 5:
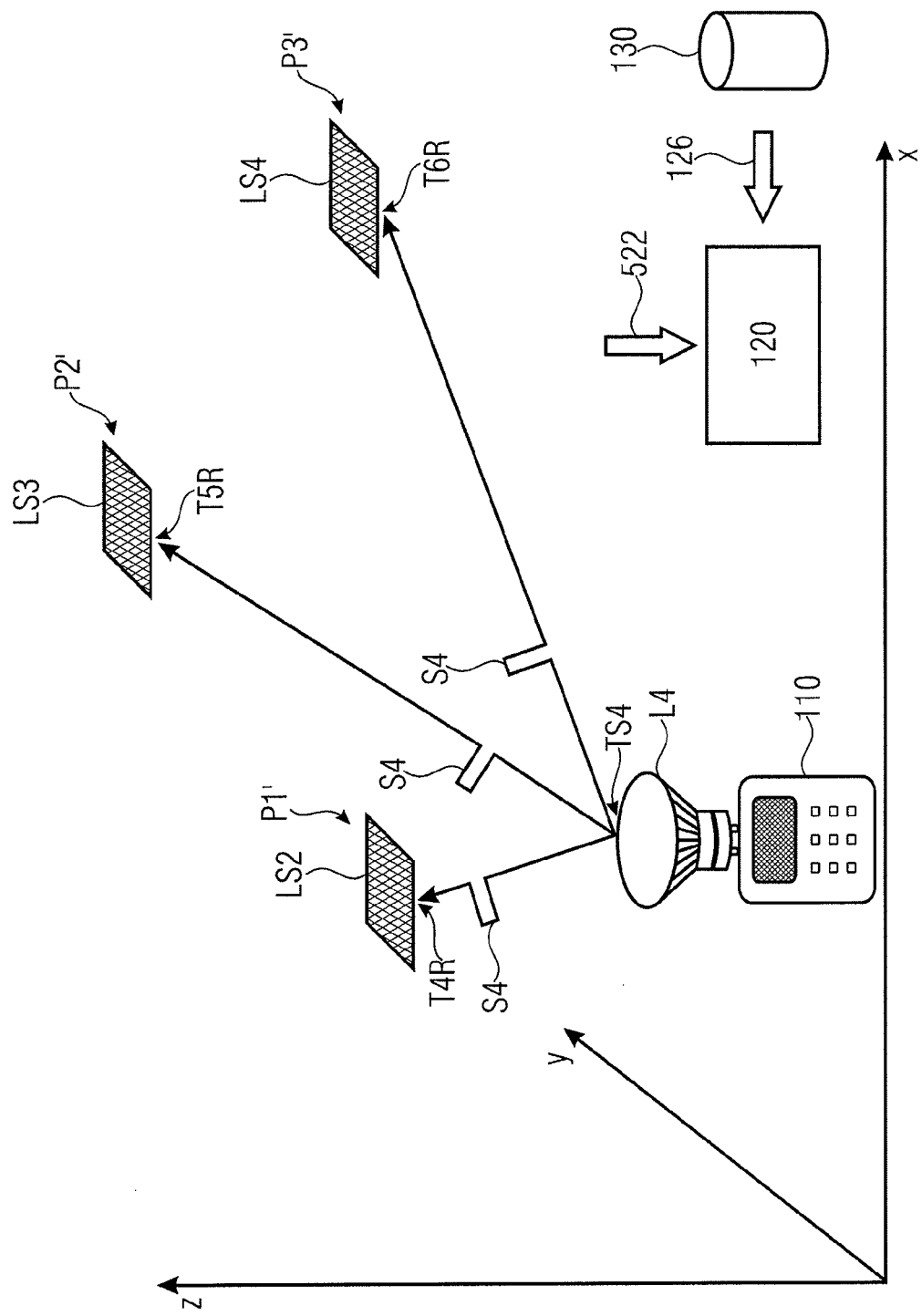
FIG. 5 shows a schematical illustration of an embodiment for determining a position of a moving object using a fluorescence LED mounted to the object and three light sensors.

FIG. 5 shows an embodiment of a system for determining a position of a moving object 110 with a fluorescence LED 4 mounted to the moving object 110, and an arrangement of at least three light sensors LS2 to LS4, an evaluation unit 120 and (optionally) a data base or a memory 130. The fluorescence LED L4 is implemented to transmit a signal S4 with a transmission time information TS4 and a transmitter information at a transmission time TS4, wherein the transmitter information enables an allocation of the signal S4 to a mobile device or the light sensor, and the transmission time information TS4 has information on the time when the light signal S4 was transmitted by the fluorescence LED L4. The light signal S4 is received by the first light sensor LS2 arranged at a position P1' at a first time T4R, by a second light sensor LS3 arranged at a second position P2' at a second receive time T5R and by the third light sensor LS4 arranged at a third position P3' at a third receive time T6R. The first light sensor LS2 is implemented to allocate the first signal receive time T4 to the received signal S4, the second light sensor LS3 is implemented to allocate the second signal receive time T5R to the received signal S4 and the third light sensor LS4 is implemented to allocate the third signal receive time T6R to the received light signal S4.

The light sensors LS2 to LS4 are connected to the evaluation unit 120, for example via a contactless or a contact-based interface (see arrow 522) and the evaluation unit 120 is implemented, based on the transmitter identification (which may simultaneously be a signal identification, wherein it is important that the three received signals S4 may be allocated to each other), the transmission time information TS4, the first to third receive time T4R to T6R and the positions P1' to P3' of the light sensors LS2 to LS4, to determine the position of the object. This may be similar to the embodiments according to FIG. 1 regarding multi-lateration methods (TOA methods), hyperbola based locating methods (TDOA methods) or other suitable methods.

The further information regarding the embodiments according to FIG. 1, which may also be referred to as downlink position determination systems, accordingly apply for the embodiments according to FIG. 5, which may also be referred to as an uplink position determination method, in particular the information regarding the fluorescence LEDs and the evaluation of only the directly generated light portions.

The light sensors LS2 to LS4 are, for example, each coupled to a communication unit which, for example, contains a light sensor specific and unique device identification, for example in a memory, and a demodulator to demodulate the signal and determine the receive time and a communication unit, for example, to communicate with the evaluation unit 120, in particular transmit the data needed for position determination to the same. The light sensors LS2 to LS4 may be implemented to only transmit the identification together with the signal-relevant data or locating-relevant data (signal or transmitter identification, transmission time, receive time) and/or instead of the identification or in addition to the identification, the positions P1' to P3'. The evaluation unit 120 may be implemented to use the directly transmitted position for position determination or a position associated with the device identification from a data base or a memory 130 which may be integrated in the evaluation unit 120 or be implemented externally.

For a data transmission between the moving object, for example a mobile terminal device, and the three light sensors (or more light sensors), as already illustrated with respect to FIG. 1, time division multiplexing, code division multiplexing or other suitable multiplexing methods may be used.

A combination of the embodiments according to FIG. 1 and FIG. 2 describes on the one hand the possibility of a combined downlink and uplink position determination of the mobile device and/or a bidirectional data transmission between a mobile terminal device 110 (mobile terminal both contains the light sensor LS1 and also the fluorescence LED L4) and a system integrated in the environment (including both the fluorescence LEDs L1 to L3 and also the light sensors LS1 to LS4) in order to transmit and to receive data in the visible wavelength range. Here, the first fluorescence LED L1 and the first light sensor LS2 may be arranged at the same position, possibly also integrated in one transmit/receive element, or be arranged in different positions. The same applies for the fluorescence LEDs L2 and L3 and the light sensors LS3 and LS4.

With respect to the above explanations it may thus be noted that LED illumination means may, for example, be combined into modules and, for example, used as a ceiling lighting. Each of these modules or fluorescence LEDs L1 to L3 sends out an ID. With at least three modules L1 to L3 sensors LS may be uniquely located in space. For example, here run time methods may be applied. The accuracy increases with the number of sources or fluorescence LEDs detected by the sensor. With a bidirectional data transmission the light sensor LS may transfer back its position to the transmission station and cause a release of the information for transmission, for example restricted to a certain position area or space.

In data transmission using light, a difference may be made between uplink and downlink. A combination of both data transmissions represents a bidirectional transmission. Bidirectionality may also be achieved via alternative transmission technologies, for example IrDA or radio. FIG. 1 describes a position determination of a moving or movable receive device 110 in the downlink. The data signals S1 to S3 of the stationary light sources or fluorescence LEDs L1 to L3 each contain a time stamp T1S to T3S transmitted together with a transmitter identification. Depending on where the receiver or light sensor LS is located in the room, from the time delay of the transmitted signals a location determination may be calculated. With a bidirectional data transmission, the signals may also be rendered so that they exactly overlap in time at the receiver (constructive interference). The time delays each needed for compensation contain the spatial information. As a light source, fluorescence LEDs may be used and advantageously the directly generated light portion may be evaluated. Here, the wavelengths, also of the directly generated light portion, are not restricted to the visible range between 400 nm and 800 nm, as it was, for example, explained with reference to the UV fluorescence LED. In FIG. 5, a scheme for a position determination in the uplink is illustrated. The moving LED light source, a fluorescence LED L4, transmits a time signal S4 in eye contact. Within the room stationary mounted detectors or light sensors LS2 to LS4 are located which receive the time signal S4. The signals S4 reach the light sensors with a time delay which is correlated with the position of the radiation source or fluorescence LED L4. The location information of the moveable light source L4 or the movable receiver LS may be used with a directional connection for the control of the transmitted data. With unidirectional applications, the location determination is executed on the side of the detector, i.e., on the sides of the light sensors. The location information then, for example, serves for the legitimatization and allocation in secure transmission.

Embodiments of the invention which were described above, for example with reference to FIGS. 1 and 3, may, as mentioned above, also be realized with RGB-LEDs as general lighting LEDs. Embodiments according to FIG. 1 (downlink locating), for example comprise, instead of the first fluorescence LED, a first RGB LED L1 as a first general lighting LED, instead of the second fluorescence LED a second RGB-LED as a second general lighting LED and instead of the third fluorescence LED a third RGB-LED L3 as a third general lighting LED. The RGB-LEDs L1 to L3 are implemented to generate white light or light of a different color by means of mixing light portions of different color which are generated directly (generated by the respective typically monochromatic LED elements) and transmit the light signals S1 to S3 simultaneously by modulating an excitation current of the RGB-LEDs, e.g., by modulating an excitation current of only one LED element of the RGB-LEDs each.

In one embodiment according to FIG. 5 (uplink locating) instead of the fluorescence LED L4 embodiments may comprise an RGB-LED L4 as a general lighting LED.

The above-mentioned implementations also apply for corresponding methods for determining a position of the moving object. Thus, aspects which were described in connection with a device or a system also represent a description of the corresponding method, so that a block or a member of a device may also be regarded as a corresponding method step or as a feature of a method step. Analog to that, aspects which were described in connection with a method step also represent a description of a corresponding block or detail or feature or a corresponding device.

Embodiments of the invention may integrate the functionality of position determination in communication methods with a non-coherent radiation and may, thus, also be referred to as methods for the communication with non-coherent radiation by an integrated navigation.

Depending on the implementation arrangements, embodiments of the invention may be implemented in hardware or in software. The implementation may be executed using a digital storage medium, for example a floppy disk, a DVD, a Blue-Ray Disk, a CD, an ROM, a PROM, an EPROM, an EEPROM or a flash memory, a hard disk or another magnetic or optical memory on which electronically readable control signals are stored which may cooperate or do cooperate with a programmable computer system such that the respective method is executed. Thus, the digital storage medium may be computer-readable. Some embodiments according to the invention, thus, include a data carrier comprising electronically readable control signals which are able to cooperate with a programmable computer system such that one of the methods described herein is executed.

In general, embodiments of the present invention may be implemented as a computer program product having a program code, the program code being effective to execute one of the methods when the computer program product is executed on a computer. The program code may, for example, also be stored on a machine readable carrier.

Other embodiments include the computer program for executing one of the methods described herein, wherein the computer program is stored on a machine readable carrier.

In other words, one embodiment of the inventive method, thus, is a computer program comprising a program code for executing one of the methods described herein, when the computer program is executed on a computer. A further embodiment of the present invention is, thus, a data carrier (or a digital storage medium for a computer readable medium) on which the computer program for executing one of the methods described herein is stored.

A further embodiment includes a processing means, for example a computer or a programmable logic device which is configured or adapted to execute one of the methods described herein.

A further embodiment includes a computer on which the computer program for executing the methods which are described herein is installed.

In some embodiments, a programmable logic device, e.g., a field programmable gate array (FPGA) may be used to execute some or all functionalities of the methods described herein. In some embodiments, a field programmable gate array may cooperate with a microprocessor to execute one of the methods described herein. In general, in some embodiments the methods are executed by any type of device. This may be universally usable hardware, like a computer processor (central processing unit—CPU) or hardware which is specific for the method, like for example an ASIC (Application Specific Integrated Circuit).

The above described embodiments only represent an illustration of the principles of the present invention. It is obvious that modifications and variations of the arrangements and details described herein are obvious for other persons skilled in the art. It is, thus, the object that the invention is only limited by the scope of the following patent claims and not by the specific details presented herein with reference to the description and the disclosure of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system for determining a position of a moving object, comprising:

an arrangement comprising at least three general lighting LEDs, wherein a first general lighting LED of the at least three general lighting LEDs is implemented to transmit a first light signal comprising a first transmission time information and a first transmitter information in a first wavelength range, wherein the first transmitter information enables at least a determination of a position of the first general lighting LED and the first transmission time information is information on a point in time when the first signal was transmitted, wherein a second general lighting LED of the at least three general lighting LEDs is implemented to transmit a second light signal comprising a second transmission time information and a second transmitter information in a second wavelength range, wherein the second transmitter information enables at least a determination of a position of the second general lighting LED, and the second transmission time information is information on a point in time when the second signal was transmitted, wherein a third general lighting LED of the at least three general lighting LEDs is implemented to transmit a third light signal comprising a third transmission time information and a third transmitter information in a third wavelength range, wherein the third transmitter information enables at least a determination of a position of the third general lighting LED and the third transmission time information is information on a point in time when the third signal was transmitted, and wherein the first wavelength range, the second wavelength range and the third wavelength range at least partially overlap in an overlapping range;

a light sensor mounted to the moving object and implemented to receive the first to third light signals in the overlapping range and allocate a first signal receive time to the first light signal, allocate a second signal receive time to the second light signal and a third signal receive time to the third light signal, and an evaluation unit which is implemented to determine the position of the object based on the first to third transmitter information, the first to third transmission time information and the first to third receive time information, wherein the first general lighting LED is a first fluorescence LED which is implemented to generate white light for a general lighting by mixing a directly generated light portion and a light portion indirectly generated via a fluorescence layer, and to transmit the first light signal simultaneously by modulating an excitation current of the first fluorescence LED, wherein a wavelength range of the light portion directly generated by the first fluorescence LED forms the first wavelength range, wherein the second general lighting LED is a second fluorescence LED which is implemented to generate white light for a general lighting by mixing a directly generated light portion and a light portion generated indirectly via a fluorescence layer, and to transmit the second signal simultaneously by modulating an excitation current of the second fluorescence LED, wherein a wavelength range of the light portion generated directly by the second fluorescence LED forms the second wavelength range, and wherein the third general lighting LED is a third fluorescence LED which is implemented to generate white light for a general lighting by mixing a directly generated light portion and a light portion generated indirectly via a fluorescence layer, and to transmit the third signal simultaneously by modulating an excitation current of the third fluorescence LED, wherein a wavelength range of the light portion generated directly by the third fluorescence LED forms the third wavelength range.

2. The system according to claim 1, wherein the light sensor is implemented to only evaluate light portions within the overlapping range to determine the first to third signal receive times.

3. The system according to claim 2, wherein the light sensor comprises a filter which is more transmissive in the overlapping range than in wavelength ranges generated by the first, second or third general lighting LED.

4. The system according to claim 2, wherein the overlapping range is in a wavelength range from 420 nm to 490 nm.

5. The system according to claim 1, comprising:
a transmitter mounted to the moving object; and
a receiver, wherein the transmitter is implemented to transmit a signal to the receiver for a data transmission via a contactless interface.

6. The system according to claim 5, wherein the transmitter is a further general lighting LED and the receiver is a further light sensor.

7. The system according to claim 1, wherein the arrangement of the at least three general lighting LEDs and the light sensor are implemented to transmit the first to third light signal in a time division multiplexing method, wherein the first general lighting LED is implemented to transmit the first light signal in a first time slot of the time division multiplexing method, the second general lighting LED is implemented to transmit the second light signal in a second time slot of the time division multiplexing method and the third general lighting LED is implemented to transmit the third light signal in a third time slot of the time division multiplexing method.

8. The system according to claim 1, wherein the evaluation unit is mounted to the moving object or arranged at another location.

9. The system according to claim 1, wherein the evaluation unit is implemented to determine the position by means of a TDOA method (Time Difference of Arrival).

10. The system according to claim 1, wherein the light sensor is synchronized with the at least three general lighting LEDs and comprises a common time reference and wherein the evaluation unit is implemented to determine the position of the object by means of a TOA method (Time of Arrival).

11. A light sensor for a position determination of a moving object, when the light sensor is mounted to the moving object, wherein the light sensor is implemented to receive a first light signal of a first general lighting LED comprising a first transmitter identification and a first transmission time information in a first wavelength range, and to allocate a first receive time information to the first light signal, to receive a second light signal of a second general lighting LED comprising a second transmitter identification and a second transmission time information in a second wavelength range and to allocate a second receive time information to the second light signal, and to receive a third light signal from a third general lighting LED comprising a third transmitter identification and a third transmission time information in a third wavelength range and to allocate the third receive time information to the third light signal and to provide the first to third receive time information for position determination, wherein the first wavelength range, the second wavelength range and the third wavelength range at least partially overlap in an overlapping range, wherein the light sensor is implemented to evaluate only light portions in the overlapping range to determine the first to third signal receive time.

12. A system for determining a position of a moving object, comprising:
an arrangement of at least three general lighting LEDs, wherein a first general lighting LED of the at least three general lighting LEDs is implemented to transmit a first pulse-type light signal in a first wavelength range at a first transmission time, wherein a second general lighting LED of the at least three general lighting LEDs is implemented to transmit a second pulse-type light signal in a second wavelength range at a second transmission time comprising a first transmission time difference at the first transmission time, wherein a third general lighting LED of the at least three general lighting LEDs is implemented to transit a third pulse-type light signal in a third wavelength range at a third transmission time comprising a second transmission time difference at the first transmission time, wherein the first to third pulse-type light signals comprise an identical pulse-type form, and wherein the first wavelength range, the second wavelength range and the third wavelength range at least partially overlap in an overlapping range;
a light sensor mounted to the moving object and implemented to receive the first to third light signal in the overlapping range and generate a receive signal by means of overlaying the first to third light signal; and
an evaluation unit which is implemented to control the second general lighting LED and/or the third general lighting LED based on an evaluation of the form of the receive signal such that the second transmission time and/or the third transmission time are shifted with respect to the first transmission time such that the first to third light signal are simultaneously received by the light sensor and the evaluation unit is further implemented, based on a position of the first general lighting LED, a position of the second general lighting LED, a position of the third general lighting LED and the first and/or the second transmission time difference, to determine the position of the moving object.

13. The system according to claim 12, wherein the first general lighting LED is a first fluorescence LED which is implemented to generate white light for a general lighting by mixing a directly generated light portion with a light portion indirectly generated via a fluorescence layer and to transmit the first light signal simultaneously by modulating an excitation current of the first fluorescence LED, wherein a wavelength range of the light portion directly generated by the first fluorescence LED forms the first wavelength range,
wherein the second general lighting LED is a second fluorescence LED which is implemented to generate white light for a general lighting by mixing a directly generated light portion and a light portion indirectly generated via a fluorescence layer, and to transmit the second signal simultaneously by modulating an excitation current of the second fluorescence LED, wherein a wavelength range of the light portion directly generated by the second fluorescence LED forms the second wavelength range, and
wherein the third general lighting LED is a third fluorescence LED which is implemented to generate white light for a general lighting by mixing a directly generated light portion and a light portion indirectly generated via a fluorescence layer, and to transmit the third signal simultaneously by modulating an excitation current of the third fluorescence LED, wherein a wavelength range of the light portion directly generated by the third fluorescence LED forms the third wavelength range.

14. The system according to claim 12, wherein the light sensor is implemented to evaluate only light portions in the overlapping range to determine the first to third signal receive time.

15. The system according to claim 14, wherein the light sensor comprises a filter which is more transmissive in the overlapping range than in other wavelength ranges generated by the first, second and third general lighting LEDs.

16. The system according to claim 14, wherein the overlapping range is in a wavelength range from 420 nm to 490 nm.

17. A method for determining a position of a moving object, comprising:
transmitting a first light signal comprising a first transmission time information and a first transmitter information in a first wavelength range, by a first general lighting LED, wherein the first transmitter information enables at least a determination of a position of the first general lighting LED and the first transmission time information is information about a point in time when the first signal was transmitted;
transmitting a second light signal comprising a second transmission time information and a second transmitter information in a second wavelength range by a second general lighting LED, wherein the second transmitter information enables at least a determination of a position of the second general lighting LED and the second transmission time information is information about a point in time when the second signal was transmitted;
transmitting a third light signal comprising a third transmission time information and a third transmitter information in a third wavelength range by a third general lighting LED, wherein the third transmitter information enables at least a determination of a position of the third general lighting LED and the third transmission time information is information about a point in time when the third signal was transmitted, wherein the first wavelength range, the second wavelength range and the third wavelength range at least partially overlap in an overlapping range;
receiving the first to third light signals in the overlapping range by a light sensor mounted to the moving object;
allocating a first signal receive time to the first light signal;
allocating a second signal receive time to the second light signal;
allocating a third signal receive time to the third light signal; and
determining the position of the object based on the first to third transmitter information, the first to third transmission time information and the first to third receive time information,
wherein the first general lighting LED is a first fluorescence LED which is implemented to generate white light for a general lighting by mixing a directly generated light portion and a light portion indirectly generated via a fluorescence layer, and to transmit the first light signal simultaneously by modulating an excitation current of the first fluorescence LED, wherein a wavelength range of the light portion directly generated by the first fluorescence LED forms the first wavelength range,
wherein the second general lighting LED is a second fluorescence LED which is implemented to generate white light for a general lighting by mixing a directly generated light portion and a light portion generated indirectly via a fluorescence layer, and to transmit the second signal simultaneously by modulating an excitation current of the second fluorescence LED, wherein a wavelength range of the light portion generated directly by the second fluorescence LED forms the second wavelength range, and
wherein the third general lighting LED is a third fluorescence LED which is implemented to generate white light for a general lighting by mixing a directly generated light portion and a light portion generated indirectly via a fluorescence layer, and to transmit the third signal simultaneously by modulating an excitation current of the third fluorescence LED, wherein a wavelength range of the light portion generated directly by the third fluorescence LED forms the third wavelength range.

18. A method for determining a position of a moving object, comprising:
transmitting a first pulse-type light signal in a first wavelength range by a first general lighting LED at a first transmission time;
transmitting a second pulse-type light signal in a second wavelength range by a second general lighting LED at a second transmission time comprising a first transmission time difference to the first transmission time;
transmitting a third pulse-type light signal in a third wavelength range by a third general lighting LED at a third transmission time comprising a second transmission time difference to the first transmission time, wherein the first to third pulse-type light signal comprise an identical pulse-like form and wherein the first wavelength range, the second wavelength range and the third wavelength range at least partially overlap in an overlapping range;
receiving the first to third light signals in the overlapping range by a light sensor mounted to the moving object;
generating a receive signal by means of overlaying the first to third light signals; and
controlling the second general lighting LED and/or the third general lighting LED based on an evaluation of a form of the receive signal such that the second transmission time and/or the third transmission time are shifted with respect to the first transmission time such that the first to third light signals are received simultaneously by the light sensor;
determining the position of the moving object based on a position of the first general lighting LED, a position of the second general lighting LED, a position of the third general lighting LED and the first and/or the second transmission time difference.

19. A non-transitory computer readable medium comprising a program code for executing a method for determining a position of a moving object; comprising:
transmitting a first light signal comprising a first transmission time information and a first transmitter information in a first wavelength range, by a first general lighting LED, wherein the first transmitter information enables at least a determination of a position of the first general lighting LED and the first transmission time information is information about a point in time when the first signal was transmitted;
transmitting a second light signal comprising a second transmission time information and a second transmitter information in a second wavelength range by a second general lighting LED, wherein the second transmitter information enables at least a determination of a position of the second general lighting LED and the second transmission time information is information about a point in time when the second signal was transmitted;
transmitting a third light signal comprising a third transmission time information and a third transmitter information in a third wavelength range by a third general lighting LED, wherein the third transmitter information enables at least a determination of a position of the third general lighting LED and the third transmission time information is information about a point in time when the third signal was transmitted, wherein the first wavelength range, the second wavelength range and the third wavelength range at least partially overlap in an overlapping range;

receiving the first to third light signals in the overlapping range by a light sensor mounted to the moving object;

allocating a first signal receive time to the first light signal;

allocating a second signal receive time to the second light signal;

allocating a third signal receive time to the third light signal; and determining the position of the object based on the first to third transmitter information, the first to third transmission time information and the first to third receive time information, wherein the first general lighting LED is a first fluorescence LED which is implemented to generate white light for a general lighting by mixing a directly generated light portion and a light portion indirectly generated via a fluorescence layer, and to transmit the first light signal simultaneously by modulating an excitation current of the first fluorescence LED, wherein a wavelength range of the light portion directly generated by the first fluorescence LED forms the first wavelength range, wherein the second general lighting LED is a second fluorescence LED which is implemented to generate white light for a general lighting by mixing a directly generated light portion and a light portion generated indirectly via a fluorescence layer, and to transmit the second signal simultaneously by modulating an excitation current of the second fluorescence LED, wherein a wavelength range of the light portion generated directly by the second fluorescence LED forms the second wavelength range, and wherein the third general lighting LED is a third fluorescence LED which is implemented to generate white light for a general lighting by mixing a directly generated light portion and a light portion generated indirectly via a fluorescence layer, and to transmit the third signal simultaneously by modulating an excitation current of the third fluorescence LED, wherein a wavelength range of the light portion generated directly by the third fluorescence LED forms the third wavelength range, when the computer program is executed on a computer.

20. A non-transitory computer readable medium comprising a program code for executing a method for determining a position of a moving object, comprising:

transmitting a first pulse-type light signal in a first wavelength range by a first general lighting LED at a first transmission time;

transmitting a second pulse-type light signal in a second wavelength range by a second general lighting LED at a second transmission time comprising a first transmission time difference to the first transmission time;

transmitting a third pulse-type light signal in a third wavelength range by a third general lighting LED at a third transmission time comprising a second transmission time difference to the first transmission time, wherein the first to third pulse-type light signal comprise an identical pulse-like form and wherein the first wavelength range, the second wavelength range and the third wavelength range at least partially overlap in an overlapping range;

receiving the first to third light signals in the overlapping range by a light sensor mounted to the moving object;

generating a receive signal by means of overlaying the first to third light signals; and controlling the second general lighting LED and/or the third general lighting LED based on an evaluation of a form of the receive signal such that the second transmission time and/or the third transmission time are shifted with respect to the first transmission time such that the first to third light signals are received simultaneously by the light sensor;

determining the position of the moving object based on a position of the first general lighting LED, a position of the second general lighting LED, a position of the third general lighting LED and the first and/or the second transmission time difference, when the computer program is executed on a computer.

* * * * *